(12) United States Patent
Gohou (10) Patent No.: US 6,807,928 B2
(45) Date of Patent: Oct. 26, 2004

(54) CONTROL DEVICE FOR A CONTROL MOTOR OF AN INTERNAL COMBUSTION ENGINE

(75) Inventor: Manabu Gohou, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/287,603

(22) Filed: Nov. 5, 2002

(65) Prior Publication Data

US 2003/0150412 A1 Aug. 14, 2003

(30) Foreign Application Priority Data

Feb. 14, 2002 (JP) ........................................ 2002-036259

(51) Int. Cl.[7] .............................................. F02D 41/14
(52) U.S. Cl. .................................. 123/65 PE; 123/323
(58) Field of Search ............................ 123/65 PE, 323, 123/65 V; 318/601; 251/129.11

(56) References Cited

U.S. PATENT DOCUMENTS

| | | | | |
|---|---|---|---|---|
| 4,793,347 A | * | 12/1988 | Taniuchi et al. | ........ 123/65 PE |
| 5,502,963 A | * | 4/1996 | Inaba | .................... 123/65 PE |
| 6,039,012 A | * | 3/2000 | Motoyama | .............. 123/65 PE |
| 6,227,922 B1 | * | 5/2001 | Ochiai | .................... 123/65 PE |
| 6,481,394 B1 | * | 11/2002 | Hiki | ........................ 123/65 PE |
| 6,508,214 B1 | * | 1/2003 | Uchida | .................. 123/65 PE |
| 6,591,606 B2 | * | 7/2003 | Rosskamp et al. | ...... 123/65 PE |
| 6,622,671 B2 | * | 9/2003 | Uchida | .................... 123/65 PE |
| 2003/0150411 A1 | | 8/2003 | Gohou | |

FOREIGN PATENT DOCUMENTS

| | | |
|---|---|---|
| JP | 1-58739 U | 4/1989 |
| JP | 8-23313 | 3/1996 |

OTHER PUBLICATIONS

Patent Abstracts of Japan, Publication No. 2000–303915, Publication date: Oct. 31, 2000.
Patent Abstracts of Japan, Publication No. 10–089099, Publication date: Apr. 7, 1998.

* cited by examiner

*Primary Examiner*—Henry C. Yuen
*Assistant Examiner*—Jason Benton
(74) *Attorney, Agent, or Firm*—Sughrue Mion, PLLC (57) ABSTRACT

The operational state of the engine is detected and the target value of the motor is computed corresponding to the operational state (step S1); a current value of the motor is obtained (step S2); and the width of a stop target area that is a determination parameter is selected based on the target value and the current value (step S3). The stop target area is obtained based on the selected width of the stop target area and the target value (step S4). If the current value falls within the stop target area, then a motor control signal is determined so as to maintain the current value, and if the current value is beyond the stop target area, then the motor control signal is determined so as to draw the current value toward the target value (steps S6 and S7).

9 Claims, 7 Drawing Sheets

CONTROL DEVICE FOR A CONTROL MOTOR OF AN INTERNAL COMBUSTION ENGINE

BACKGROUND OF THE INVENTION

1. Field of the Invention

The present invention relates to a control device for a control motor of an internal combustion engine, and more particularly to a control device for a control motor of an internal combustion engine in which the control device causes the control motor to follow a target value obtained according to an engine operation state of the internal combustion engine.

2. Description of the Related Art

Since rpm changes and load changes in a vehicle engine are great, research has already been made into techniques which detect an operational state of the engine and control the opening and closing of a variety of control valves to achieve the optimum control in response to the operational state of the engine. For example, JP 62-126222 A describes a technique in which an exhaust control valve is provided near an open end on the downstream side of an exhaust pipe, and output increase is achieved by fully opening the control valve when the engine is in a high speed region, to utilize a dynamic effect of an exhaust system to a maximum limit on the one hand, and closing the control valve to approximately a ½-opening degree to prevent the dynamic effect from operating in a reverse fashion in a medium speed region where a torque valley would be generated. A variety of proposals have also been made in which a control valve is provided to an interconnecting pipe connecting a plurality of intake pipes, and the control valve is caused to open and close with the engine rpm to essentially change the length of the intake pipe.

Figure 5:
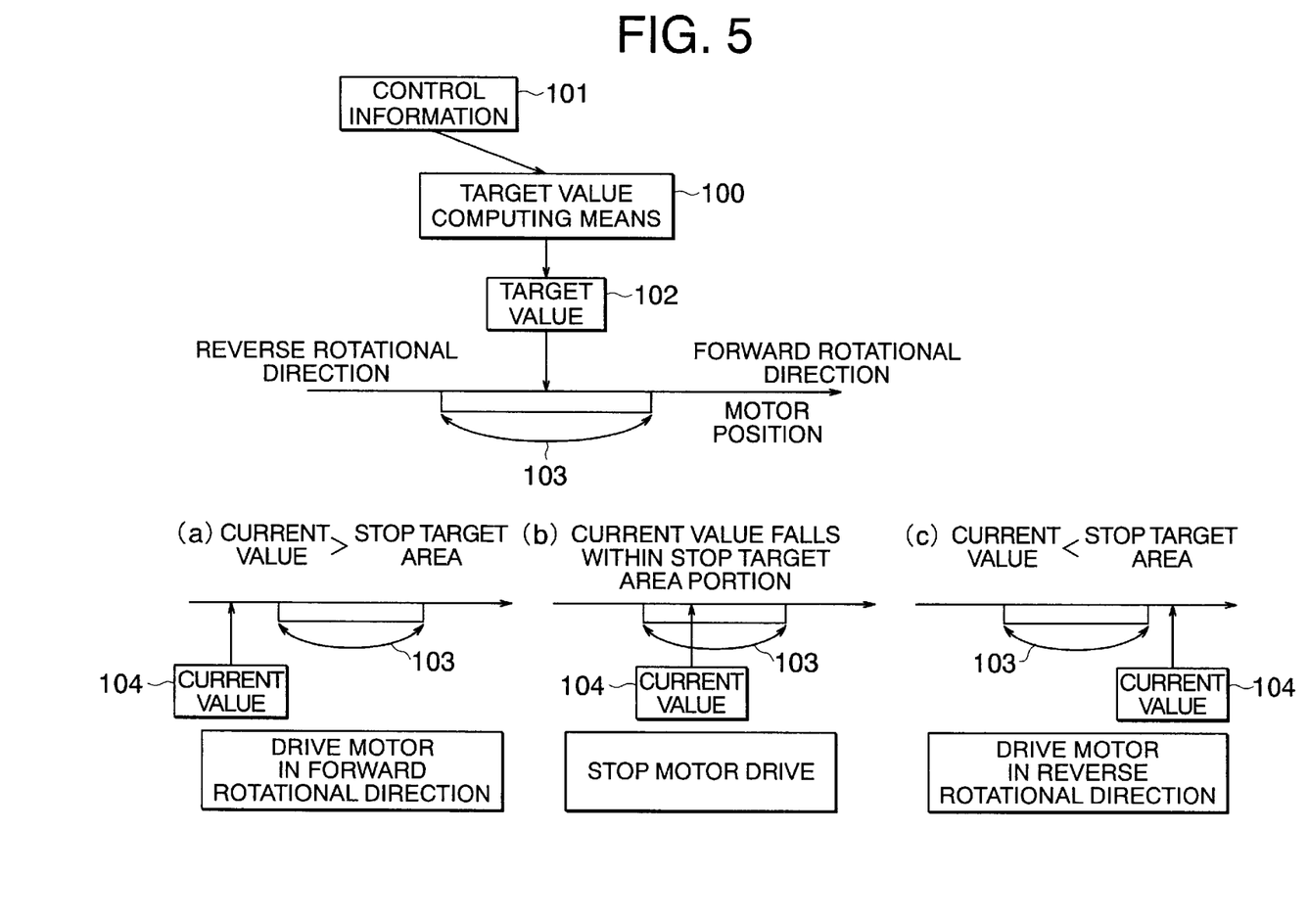
FIG. 5 is an explanatory diagram illustrating how the stop target area is obtained and motor control performed based on a relationship between the stop target area and a current opening degree, in a conventional method in which a motor is used to control a control valve to follow a target opening degree.
Figure 6:
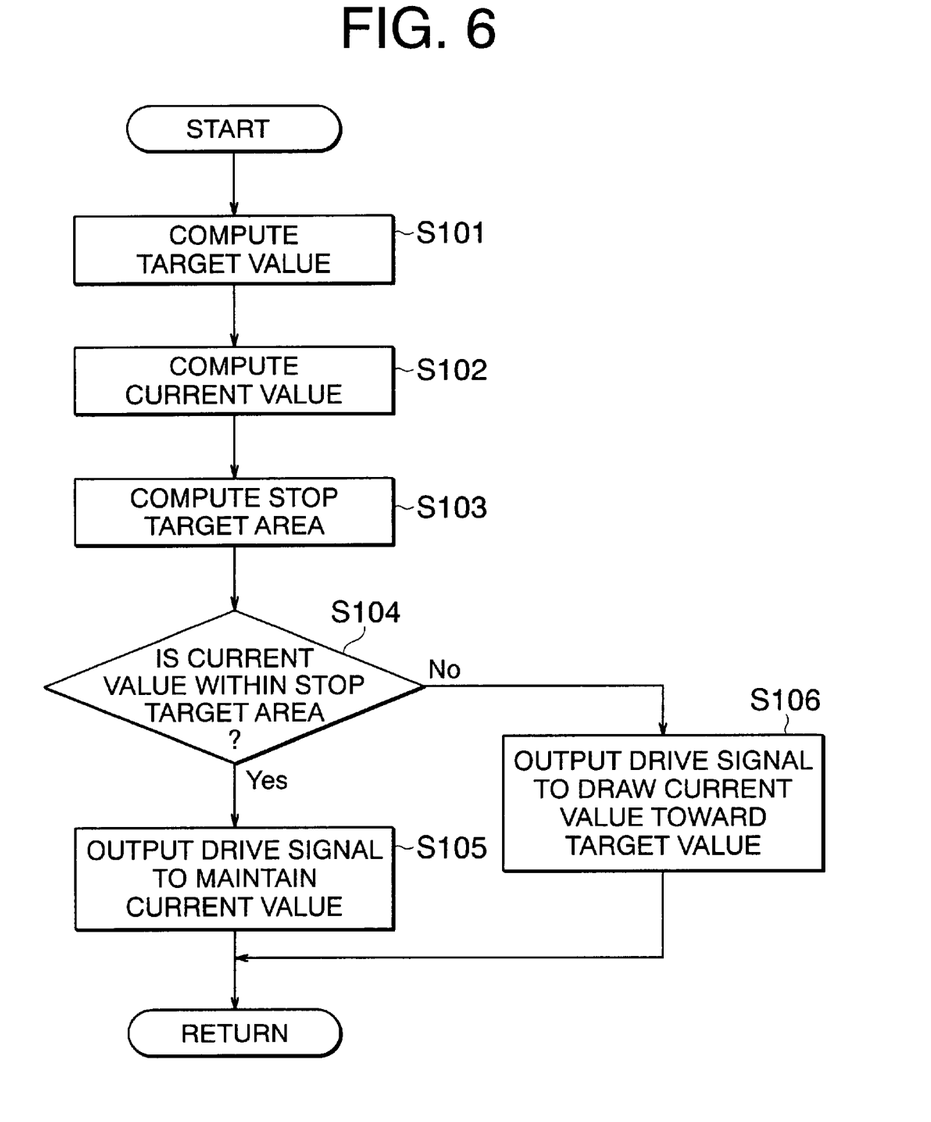
FIG. 6 is a flow chart of a conventional method in which a motor is used to control a control valve to follow a stop target opening degree.

FIG. 5 shows one example of a method in which a motor controls these control valves so as to follow a target opening degree. In FIG. 5, reference numeral 100 indicates a target value computing means for computing a target value of an opening degree of the control valve (hereinafter, referred to as the target opening degree), reference numeral 101 indicates control information representing the engine's operational state which is used in the computation of the target value by the target value computing means 100, reference numeral 102 indicates the target value computed by the target value computing means 100, and reference numeral 103 indicates a stop target area which is set at a given width with the target value as the center of the width. As shown in the flow chart in FIG. 6, in accordance with this method, first, a variety of sensors are used to detect the operational state of the engine which serves as control information, and from the control information the target value computing means 100 computes the target opening degree for the control valve that is the subject of the control (step S101). Then the current opening degree is computed (step S102), the stop target area is set around the computed target opening degree (step S103), and the current opening degree and the stop target area are compared (step S104). Then, if the current value is within the stop target area, the current value is kept (step S105), and if the current value is beyond the stop target area, a control is performed to output a motor control signal so as to bring the current value closer to the target value (step S106).

Figure 7:
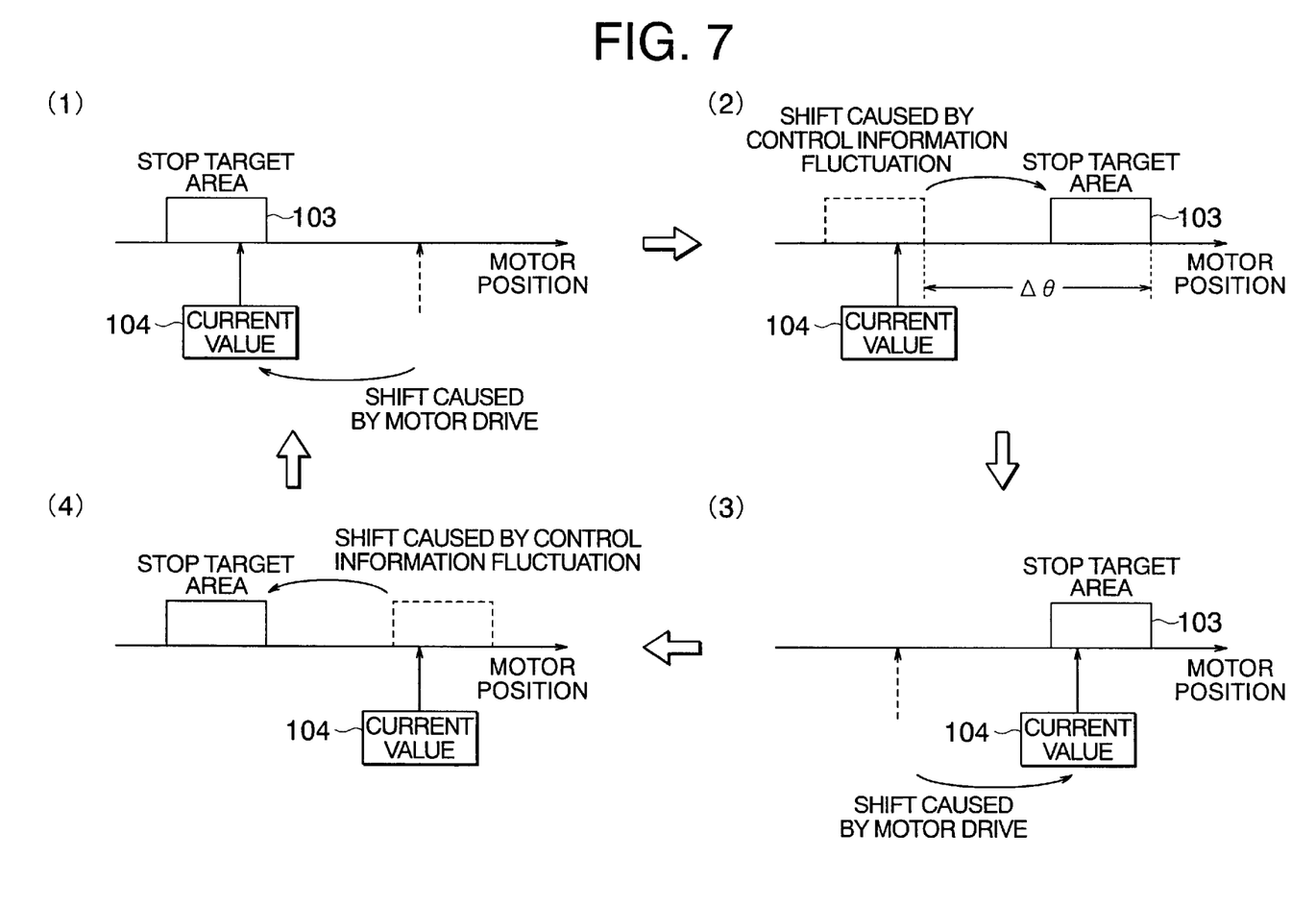
FIG. 7 is an explanatory diagram illustrating vibration in the current opening degree caused by a great fluctuation in the target opening degree, in the conventional method in which a motor is used to control a control valve to follow a stop target opening degree.

As described above, in the method in which the motor is used to control the control valve so that the control valve follows the target opening degree, the target opening degree is computed based on the control information indicating the engine's operational state. Therefore, when an operation is performed to keep uniformly the control information, in a case where the control information has a characteristic that it always fluctuates, like engine rpm for example even when the operation is performed to uniformly maintain the control information, a phenomenon may occur in which the control valve and the motor which manipulates the control valve vibrate. This phenomenon occurs in the case where there is an area where the changes in the control information cause an amount of change Δθ in the target opening degree to be greater than the width of the stop target area. This phenomenon occurs according to the sequence shown in FIG. 7. In FIG. 7, reference numeral 103 refers to the stop target area and reference numeral 104 refers to the current value. Portion (1) of FIG. 7 illustrates a state in which the motor current is turned off. In this state, the target opening degree fluctuates by an amount equal to Δθ. Along with this fluctuation, the stop target area 103 shifts in the forward rotational direction of the motor position by an amount equal to . . . , and enters the state shown in portion (2) of FIG. 7. In this state, the motor current flows so as to create a forward rotation, causing the current value 104 to shift in the forward rotational direction to enter the state shown in portion (3) of FIG. 7. In this state, another fluctuation in the control information causes the target opening degree to change, this time in the opposite rotational direction from the motor position, entering the state shown in portion (4) of FIG. 7. The motor current then flows to create a reverse directional rotation, thereby entering the state shown in portion (1) of FIG. 7. The above is performed repeatedly.

As described above, the setting of the target value and fluctuation of the control information that the target value is based on, work in a joint fashion, causing a phenomenon in which the motor vibrates. This phenomenon implies that a large starting current is flown to the motor again and again. Thus, there has been a problem in that the temperature of the motor increases excessively and the longevity of the motor is reduced.

SUMMARY OF THE INVENTION

The present invention has been made to solve the above-mentioned problems, and an object of the present invention is therefore to obtain a control device for a control motor of an internal combustion engine, which is capable of suppressing vibration of the control motor occurring when controlling the control motor for following a target value corresponding to an operational state of the engine.

The present invention relates to a control device for a control motor of an internal combustion engine, which follows a target value that changes in response to an operational state of the internal combustion engine, the control device including: control information output means for detecting the operational state of the internal combustion engine and outputting the same as control information; target value computing means for computing the target value of the operational state of the control motor according to the control information outputted from the control information output means; current value detecting means for detecting a current value of the operational state of the control motor; motor control signal determining means for generating a motor control signal for controlling a drive applied to the control motor, based on the target value and the current value; and drive means for driving the control motor based on the motor control signal, in which the motor control signal determining means has a parameter for determining the motor control signal to be outputted, and the value of the parameter is set by selecting one from among a plurality of values based on the control information.

DETAILED DESCRIPTION OF THE PREFERRED EMBODIMENTS

Figure 1:
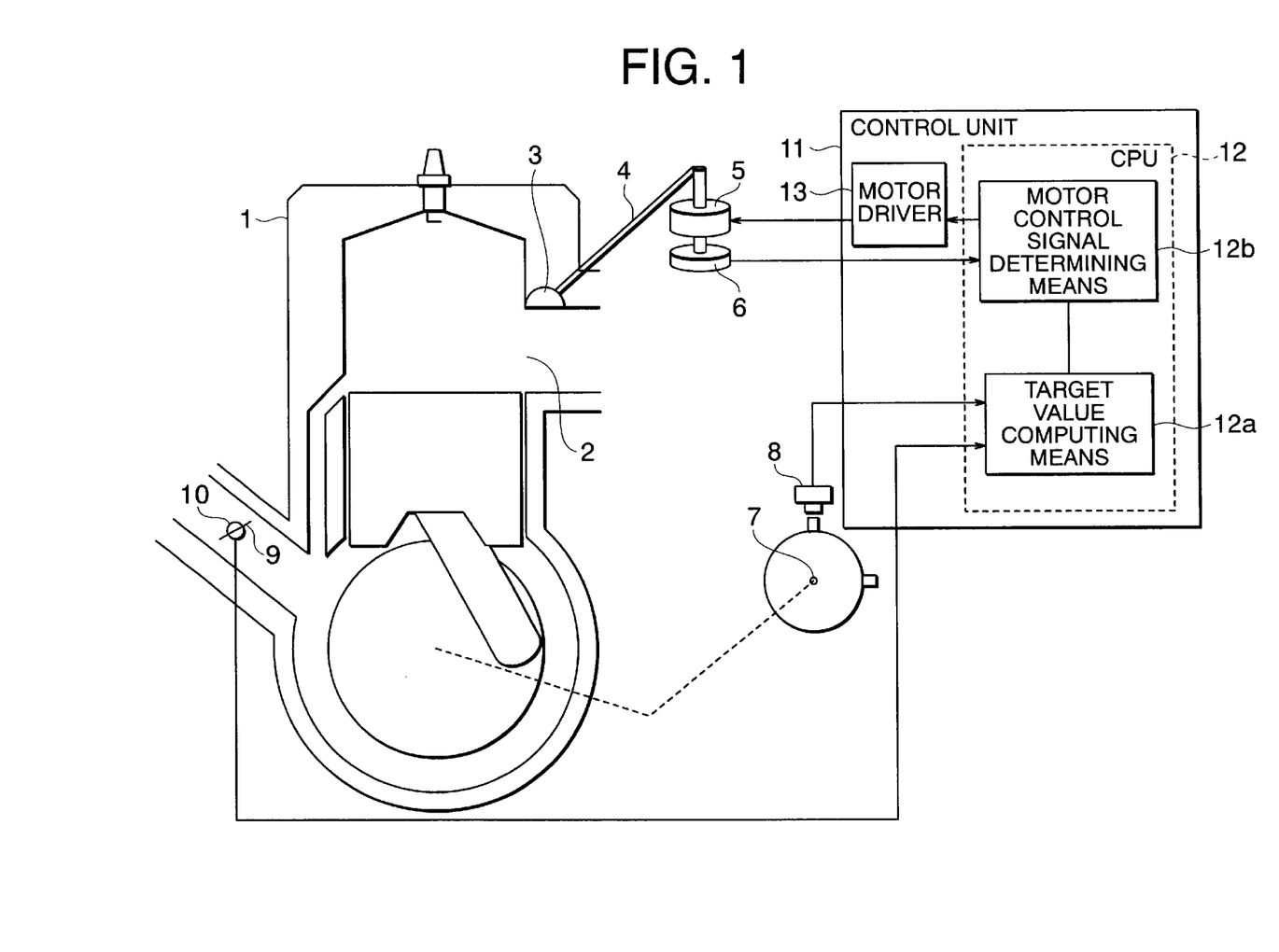
FIG. 1 is a diagram of an overall construction of a control device for a control motor of an internal combustion engine according to an embodiment of the present invention.

Explanation will now be made of an embodiment of the present invention. FIG. 1 is a diagram showing an overall construction of a control device for a control motor of an internal combustion engine in accordance with this embodiment. In FIG. 1, reference numeral 1 refers to an engine, reference numeral 2 refers to an exhaust port, reference numeral 3 refers to an exhaust valve, reference numeral 4 refers to a wire cable, reference numeral 5 refers to a control motor, reference numeral 6 refers to a potentiometer, reference numeral 7 refers to a crank shaft, reference numeral 8 refers to a rotation sensor, reference numeral 9 refers to a throttle valve, reference numeral 10 refers to a throttle position sensor, reference numeral 11 refers to a control unit, reference numeral 12 refers to a CPU, reference numeral 12a refers to a target value computing means, reference numeral 12b refers to a motor control signal determining means and reference numeral 13 refers to a motor driver.

As shown in FIG. 1, the engine 1 is a cycle engine, and the exhaust valve 3 is provided to the exhaust port 2. The exhaust valve 3 operates in association with the motor 5 by means of the wire cable 4. The motor 5 is installed with the potentiometer 6 serving as a current value detecting means, which detects the current rotational angle of the motor 5. Serving as an operational state detecting means 8A (see FIG. 3), the crank shaft 7 is installed with the rotation sensor 8 which detects a signal indicating the rotational angle of the crank shaft 7, thereby detecting the rpm of the engine. The throttle valve 9 is installed with the throttle position sensor 10 which detects the opening degree at which the throttle is opened.

The control unit 11 includes the CPU 12, the motor driver 13 and the like. The CPU 12 has the target value computing means 12a which computes the target opening degree of the exhaust valve based on the engine rpm from the rotation sensor 8 and based on the information about the throttle opening degree from the throttle position sensor 10; and the motor control signal determining means 12b which controls the output of the motor control signal based on the computed target opening degree, based on the current rotation angle information of the motor from the potentiometer 6 and based on the engine rpm. The motor driver 13 is a driver for driving the motor 5, and outputs a drive current to the motor 5 by means of a motor control signal from the CPU 12.

Figure 2:
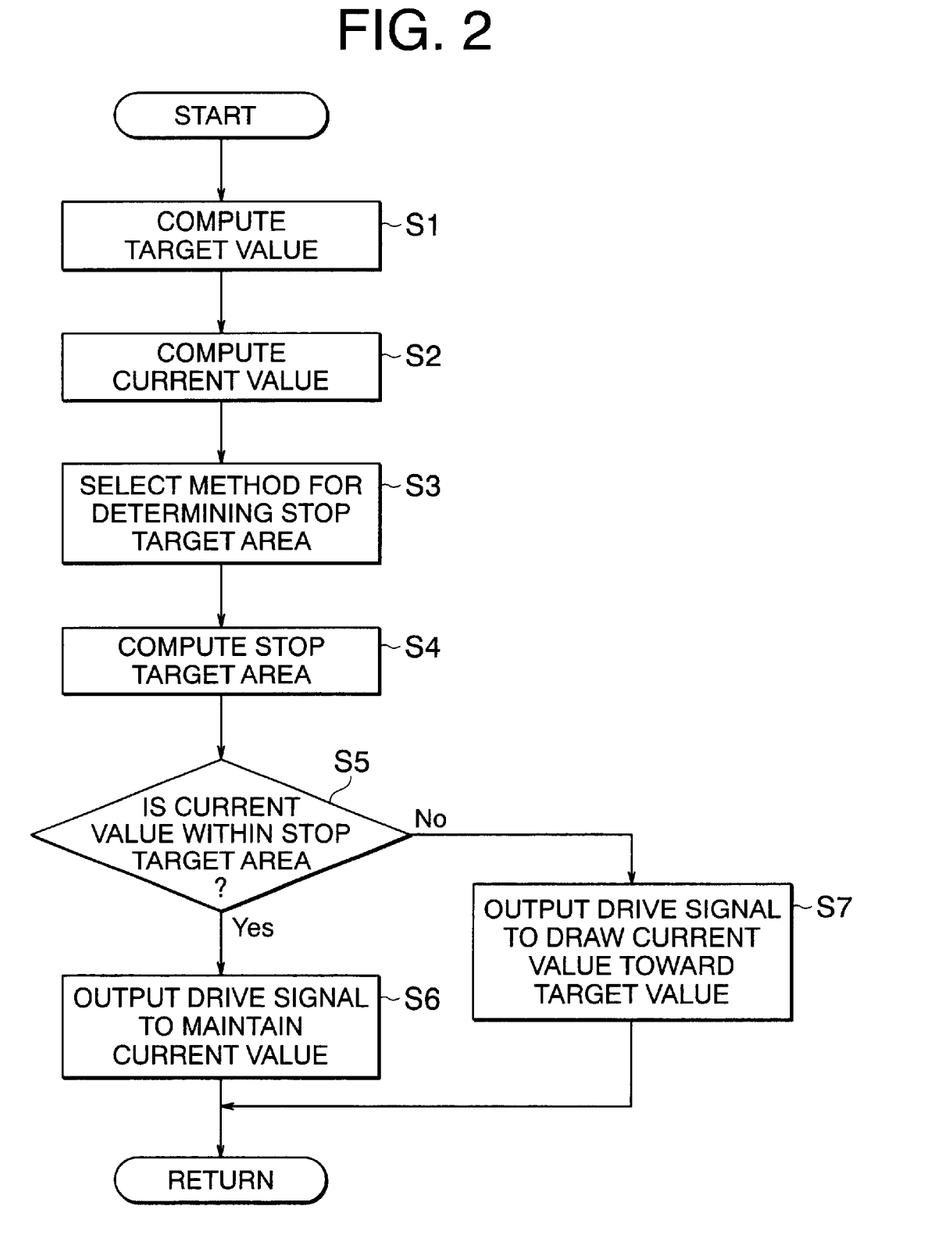
FIG. 2 is a flow chart showing operations of the control device for a control motor of an internal combustion engine according to the present invention.
Figure 3:
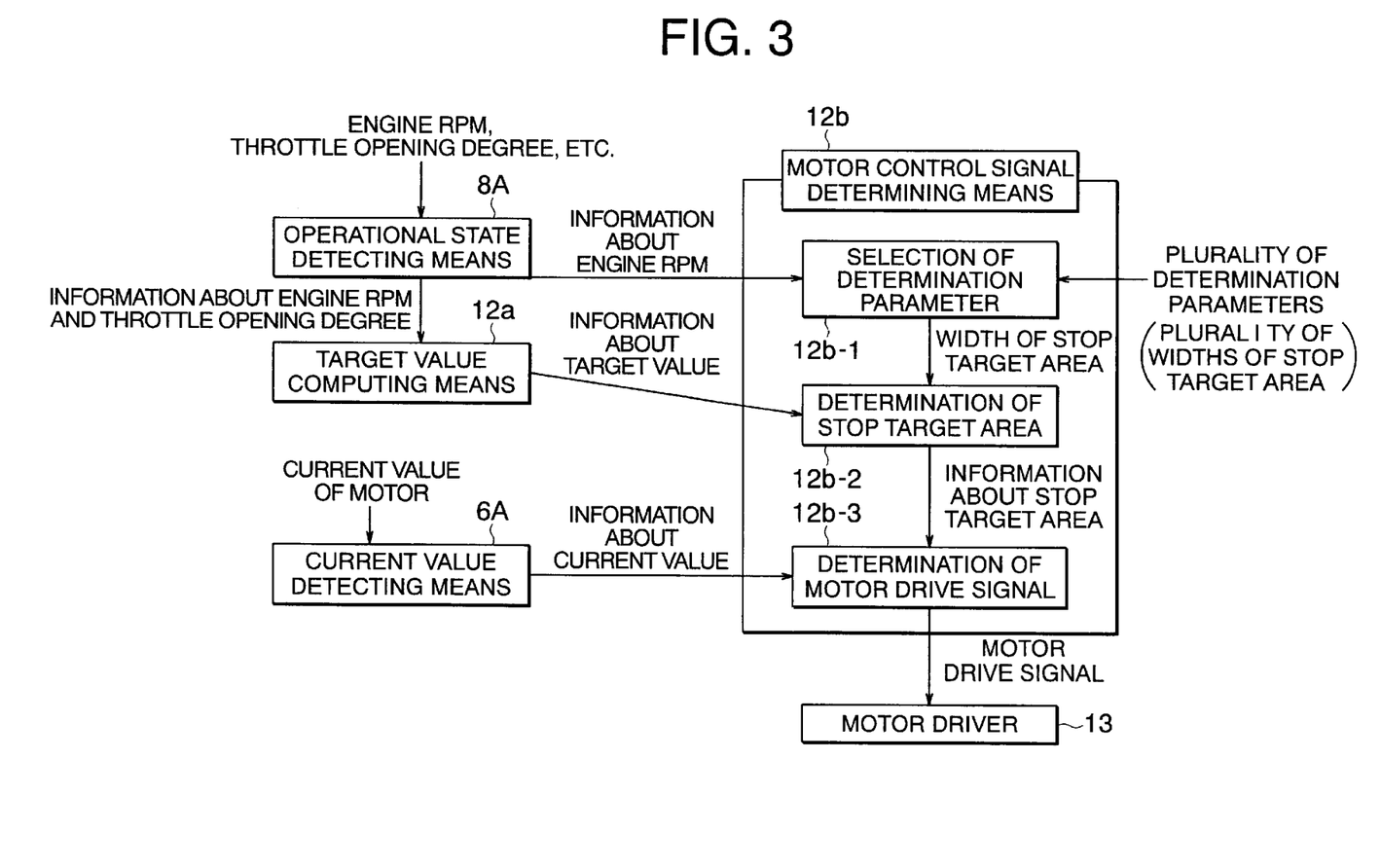
FIG. 3 is an explanatory diagram illustrating a flow of information in control operations in the control device for a control motor of an internal combustion engine according to the present invention.

Next, explanation will now be made of operations according to this embodiment. FIG. 2 is a flow chart of controls in the present invention. In accordance with this embodiment, the sequence of operations is repeated once per a given duration of time (for example, every 5 msec). FIG. 3 is a diagram showing a flow of information according to this embodiment. First, the CPU 12 detects the information about the engine's operational state such as the engine rpm, and the throttle opening degree by using the operational state detecting means 8A, and uses the information about the engine's operational state to compute the target value using the target value computing means 12a (step S1). Next, the current value is detected by the potentiometer 6 which serves as a current value detecting means 6A (step S2). Note that the current value may be directly detected by various sensors; however, in the case where the current value can only be learned in an indirect fashion, the current value may be obtained by computation. A determination parameter selecting section 12b-1 of the motor control signal determining means 12b selects one of a plurality of determination parameters, based on the engine rpm detected by the operational state detecting means 8A (step S3). These determination parameters are a set of choices as to the width of a stop target area. The selected width for the stop target area and the target value are used by a stop target area determining section 12b-2 of the motor control signal determining means 12b to derive the stop target area (step S4). In this embodiment, the stop target area is established with a width equivalent before and after the target value. Next, a motor drive signal determining section 12b-3 of the motor control signal determining means 12b compares the current value and a target area (step S5), to thereby control the output of the motor drive signal. The output of the motor drive signal is determined as follows: in the case where the current value falls within the stop target area, the drive being applied to the motor 5 is stopped so that the motor's current value will be maintained (step S6), and in the case where the current value is beyond the stop target area, the current value of the motor 5 is drawn toward the stop target area (step S7). The motor driver 13 uses the motor drive signal to output the drive current, to thereby drive the motor 5.

Figure 4A:
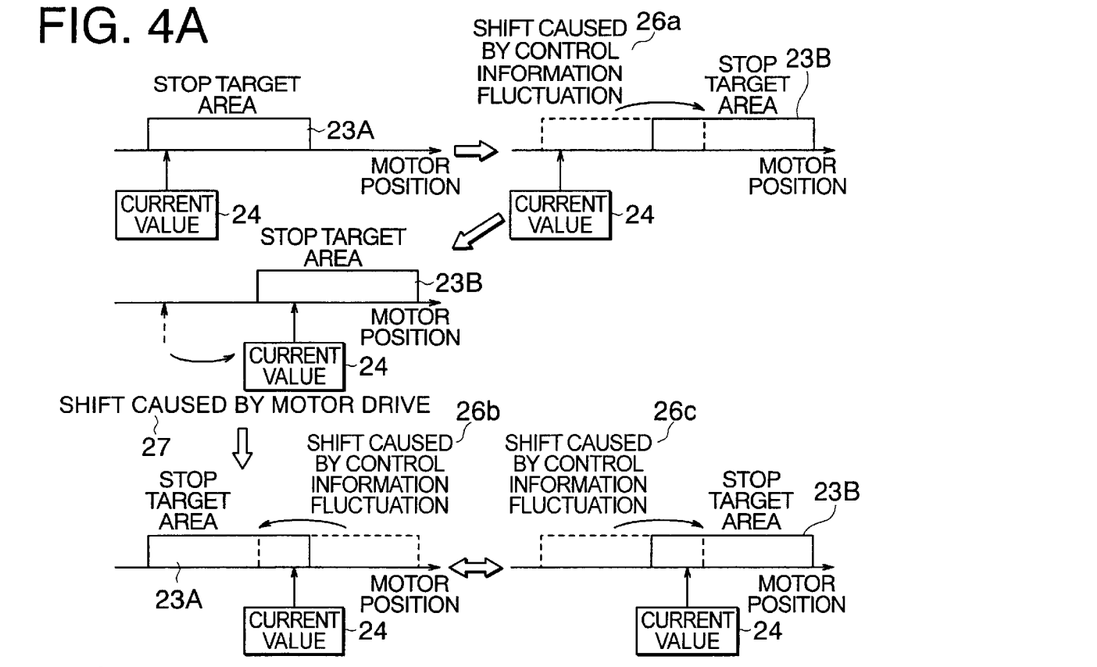
FIG. 4 illustrates two cases of relationships among a target value, a stop target area and a current value in accordance with the embodiment of the present invention.

In this embodiment, first, as shown in FIG. 4A, in the area where the amount of change of the target value with respect to the engine rpm is sharp, the determination parameters regarding the width of the stop target area are set so that the width will be wide. This alleviates the phenomenon caused jointly by the setting of the target value and the engine rpm fluctuation in which the motor vibrates. That is, the width of a stop target area 23A is set so as to be wider than the amount of change $\Delta\theta$ of the target opening degree caused by the fluctuation of the control information. As a result, as shown in the upper left diagram in FIG. 4A, the motor current is turned off but control information fluctuation 26A causes the target opening degree to fluctuate by an amount equivalent to Δθ. When this happens, the stop target area 23A shifts in the forward rotational direction of the motor position by an amount equal to Δθ, thus entering the state shown in the upper right diagram in FIG. 4. In this state, the motor current flows to create a forward rotation, thus causing a current value 24 to shift in the forward rotational direction, thereby entering the state shown in the middle diagram shown in FIG. 4. Even if another control information fluctuation 26b causes the target opening degree to fluctuate this time in the reverse rotational direction of the motor position, the current value falls within the stop target area 23A as shown in the bottom left diagram of FIG. 4. Accordingly, the current value is maintained as it is. Even if the target opening degree is caused to fluctuate by control information fluctuation 26c, the current value is maintained as it is as shown in the bottom right diagram of FIG. 4, and thus the motor does not vibrate.

Figure 4B:
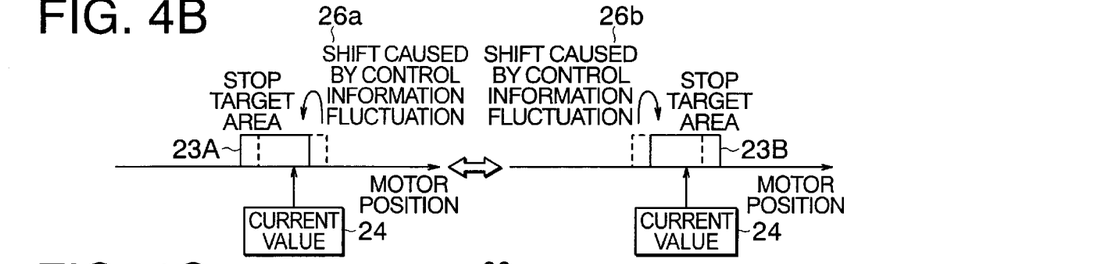

Further, as shown in FIG. 4B, in the region where the amount of change by the target value with respect to the engine rpm is milder, the determination parameter regarding the width of the stop target area is set narrower. As a result, the current value is guided to stop in the vicinity of the target value. In other words, even if the target opening degree fluctuates in accordance with the fluctuation of the control information, the amount of change of the target opening degree is small. Therefore, as shown in FIG. 4B, the current value will fall within the stop target area, and thus the motor does not vibrate.

Figure 4C:
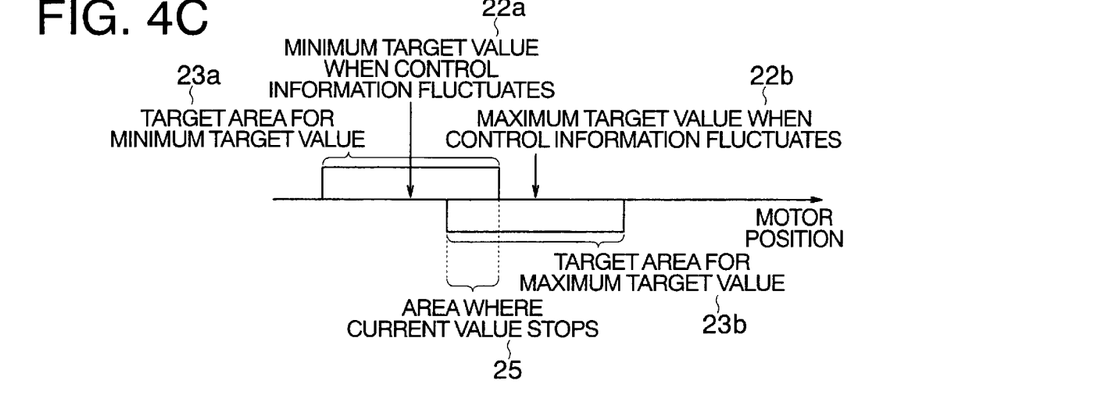

As shown in FIG. 4C, both in the case shown in FIG. 4A and in the case shown in FIG. 4B, the current value is guided to fall within a region 25 where there is an intersection between a target area 23b where the target value is at a maximum (reference numeral 22b), and the stop target area 23a where the target value is at a minimum (reference numeral 22a).

With this embodiment, the present invention is applied to the motor 5 for opening and closing the exhaust valve 3 which is furnished to an exhaust port 2, to alleviate the phenomenon of the motor vibration caused jointly by the setting of the target value and the fluctuation of the engine rpm. However, the present invention may also be used in the control of another motor such as a control valve motor for controlling the length of an intake pipe.

Further, in the above-mentioned embodiment, the target value computing means uses the engine rpm and the throttle opening degree as the control information. However, other information such as negative pressure in an intake pipe and intake air temperature may also be used.

Further, in the above-mentioned embodiment, the one from among the plurality of determination parameters is selected based on the engine rpm. However, other information being used by the target value computing means may also be used.

As described above, in the present invention, even in a case where control information such as engine rpm is used which has a characteristic such that it always fluctuates even when manipulation is performed to uniformly maintain the control information, the one determination parameter is selected from the plurality of determination parameters based on the control information. Thus, the phenomenon of motor vibration caused jointly by the setting of the target value and the fluctuation of the control information can be alleviated, thereby enabling protection of the motor.

The present invention relates to the control device for a control motor which follows the target value that changes in response to the operational state of the internal combustion engine, the control device comprising: control information output means for detecting the operational state of the internal combustion engine and outputting the same as control information; target value computing means for computing the target value of the operational state of the control motor according to the control information outputted from the control information output means; current value detecting means for detecting the current value of the operational state of the control motor; motor control signal determining means for generating a motor control signal for controlling a drive applied to the control motor, based on the target value and on the current value; and drive means for driving the control motor based on the motor control signal, in which: the motor control signal determining means has a parameter for determining the motor control signal to be outputted; and the value of the parameter is set by selecting one from among a plurality of values based on the control information. Therefore, when the control motor is controlled to follow the target value corresponding to the operational state of the internal combustion engine, occurrence of the phenomenon in which the motor vibrates can be alleviated.

Further, the stop target area is set in an area which includes the target value and is of a value of the control motor operational state at which the drive applied to the control motor should be stopped, and the parameter sets the width of the stop target area, and in a case where the current value is beyond the stop target area, the motor control signal determining means determines the motor control signal so as to draw the current value of the control motor closer toward the stop target area, and in a case where the current value is within the stop target area, the motor control signal determining means determines the motor control signal so as to stop the drive being applied to the control motor. Therefore, if the width of the stop target area is selected so as to correspond to the amount of fluctuation of the target value, the occurrence of the phenomenon of the motor vibration can be alleviated.

Further, the control information has a characteristic of always fluctuating even in a case where operation is performed so as to uniformly maintain the operational state of the internal combustion engine. Thus, the phenomenon of the motor vibration occurs in a conventional case, but the motor control signal is determined by selecting one from among the plurality of determination parameters. Therefore, the occurrence of the phenomenon of the motor vibration can be alleviated.

Further, one of the control information is engine rpm, and the parameter is set by selecting one from a plurality of values based on the engine rpm. Therefore, the occurrence of the phenomenon of the motor vibration caused jointly by the setting of the target value and the fluctuation of the engine rpm can be alleviated.

Further, the internal combustion engine is a 2-stroke engine, and the control motor operates the exhaust valve provided to the exhaust port. Therefore, the occurrence of the phenomenon of the motor vibration caused jointly by the setting of the target value and the fluctuation of the engine rpm can be alleviated.

What is claimed is:

1. A control device for a control motor of an internal combustion engine, which follows a target value that changes in response to an operational state of the internal combustion engine, the control device comprising:

control information output means for detecting the operational state of the internal combustion engine and outputting the same as control information;

target value computing means for computing the target value of the operational state of the control motor according to the control information outputted from the control information output means;

current value detecting means for detecting a current value of the operational state of the control motor;

motor control signal determining means for generating a motor control signal for controlling a drive applied to the control motor, based on the target value and the current value; and drive means for driving the control motor based on the motor control signal, wherein the motor control signal determining means has a parameter for determining the motor control signal to be outputted, and the value of the parameter is set by selecting one from among a plurality of values based on the control information and wherein a stop target area is set in an area which includes the target value and is of a value of the control motor operational state at which the drive applied to the control motor should be stopped, and the parameter sets the width of the stop target area.

2. A control device for a control motor of an internal combustion engine according to claim 1, wherein:

in a case where the current value is beyond the stop target area, the motor control signal determining means determines the motor control signal so as to draw the current value of the control motor toward the stop target area, and in a case where the current value is within the stop target area, the motor control signal determining means determines the motor control signal so as to stop the drive applied to the control motor.

3. A control device for a control motor of an internal combustion engine according to claim 1 or 2, wherein the control information has a characteristic of always fluctuating even in a case where operation is performed so as to uniformly maintain the operational state of the internal combustion engine.

4. A control device for a control motor of an internal combustion engine according to any one of claims 1 through 3, wherein one of the control information is engine rpm; and the parameter is set by selecting one from a plurality of values based on the engine rpm.

5. A control device for a control motor of an internal combustion engine according to any one of claims 1 through 4, wherein the internal combustion engine is a 2-stroke engine; and the control motor operates an exhaust valve provided to an exhaust port.

6. The control device according to claim 1, wherein, the width of the stop target area is set to correspond to the amount of fluctuation of the target value, such that if the control information is fluctuating widely, the width of the stop target area is wide, and if the control information is fluctuating narrowly, the width of the stop target area is narrow.

7. A control device for a control motor of an internal combustion engine, which follows a target value that changes in response to an operational state of the internal combustion engine, comprising:

a control unit operable to:

a) detect the operational state of the internal combustion engine and output the same as control information, b) compute a target value of the operational state of a control motor according to the control information, c) detect a current value of the operational state of the control motor, d) generate a motor control signal for controlling a drive applied to the control motor, based on the target value and the current value, and e) drive the control motor based on the motor control signal;

wherein the motor control signal is determined based on a parameter, and the value of the parameter is set by selecting from among a plurality of values based on the control information; and wherein the control unit sets a stop target area which includes the target value and is of a value of the control motor operational state at which the drive applied to the control motor should be stopped, and the parameter sets the width of the stop target area.

8. The control device according to claim 7, wherein:

in a case where the current value is beyond the stop target area, the control unit determines the motor control signal so as to draw the current value of the control motor toward the stop target area, and in a case where the current value is within the stop target area, the control unit determines the motor control signal so as to stop the drive applied to the control motor.

9. The control device according to claim 7, wherein the width of the stop target area is set to correspond to the amount of fluctuation of the target value, such that is the control information is fluctuating widely, the width of the stop target area is wide, and if the control information is fluctuating narrowly, the width of the stop target area is narrow.

* * * * *